US012412036B2

(12) United States Patent
Cleverley

(10) Patent No.: US 12,412,036 B2
(45) Date of Patent: Sep. 9, 2025

(54) METHOD AND SYSTEM FOR GENERATING GEOLOGICAL LITHOSTRATIGRAPHIC ANALOGUES USING THEORY-GUIDED MACHINE LEARNING FROM UNSTRUCTURED TEXT

(71) Applicant: Paul Hugh Cleverley, Wallingford (GB)

(72) Inventor: Paul Hugh Cleverley, Wallingford (GB)

( * ) Notice: Subject to any disclaimer, the term of this patent is extended or adjusted under 35 U.S.C. 154(b) by 718 days.

(21) Appl. No.: 16/944,425

(22) Filed: Jul. 31, 2020

(65) Prior Publication Data

US 2022/0036008 A1    Feb. 3, 2022

(51) Int. Cl.
*G06F 40/295* (2020.01)
*G06F 40/284* (2020.01)
*G06N 7/01* (2023.01)
*G06N 20/00* (2019.01)

(52) U.S. Cl.
CPC .......... *G06F 40/295* (2020.01); *G06F 40/284* (2020.01); *G06N 7/01* (2023.01); *G06N 20/00* (2019.01)

(58) Field of Classification Search
USPC .......................................................... 704/9
See application file for complete search history.

(56) References Cited

U.S. PATENT DOCUMENTS

| | | | |
|---|---|---|---|
| 9,014,982 B2* | 4/2015 | Da Costa Paiva | G01V 1/362 702/14 |
| 9,122,680 B2* | 9/2015 | Isozu | G06F 16/319 |
| 2009/0198692 A1* | 8/2009 | Aparicio, IV | G06F 16/90339 |
| 2010/0042576 A1* | 2/2010 | Roettger | G06F 40/194 706/55 |
| 2011/0264430 A1* | 10/2011 | Tapscott | G01V 99/00 703/10 |
| 2015/0254567 A1* | 9/2015 | Imhof | G06N 5/047 703/10 |
| 2015/0347898 A1* | 12/2015 | Hiu | G01V 99/005 706/21 |
| 2017/0200081 A1* | 7/2017 | Allen | G06F 40/205 |
| 2019/0034812 A1* | 1/2019 | Borrel | G01V 99/005 |
| 2021/0223431 A1* | 7/2021 | Hern | G06F 30/20 |

* cited by examiner

*Primary Examiner* — Richemond Dorvil
*Assistant Examiner* — Nadira Sultana

(57) ABSTRACT

The invention is a data processing method and system for assisting geoscientists in identifying geological Lithostratigraphic analogues from unstructured text using theory-guided machine learning. The data processing system makes the necessary calculations to detect geological Lithostratigraphic entities and appropriate entity relations, accounting for space (local geography) and time (local succession) when using word associations to determine similarity. The system computes the reliability of that score, incorporating user feedback into the learned model. In particular, the data processing system operates on any digital unstructured text derived from academic literature, company reports, web pages and other sources. Similarity between the associations of words to geological Lithostratigraphic entities can be used to suggest global analogues to communities such as petroleum geoscientists in order to reduce petroleum exploration risk and improve field development decisions.

3 Claims, 11 Drawing Sheets

Figure 1:
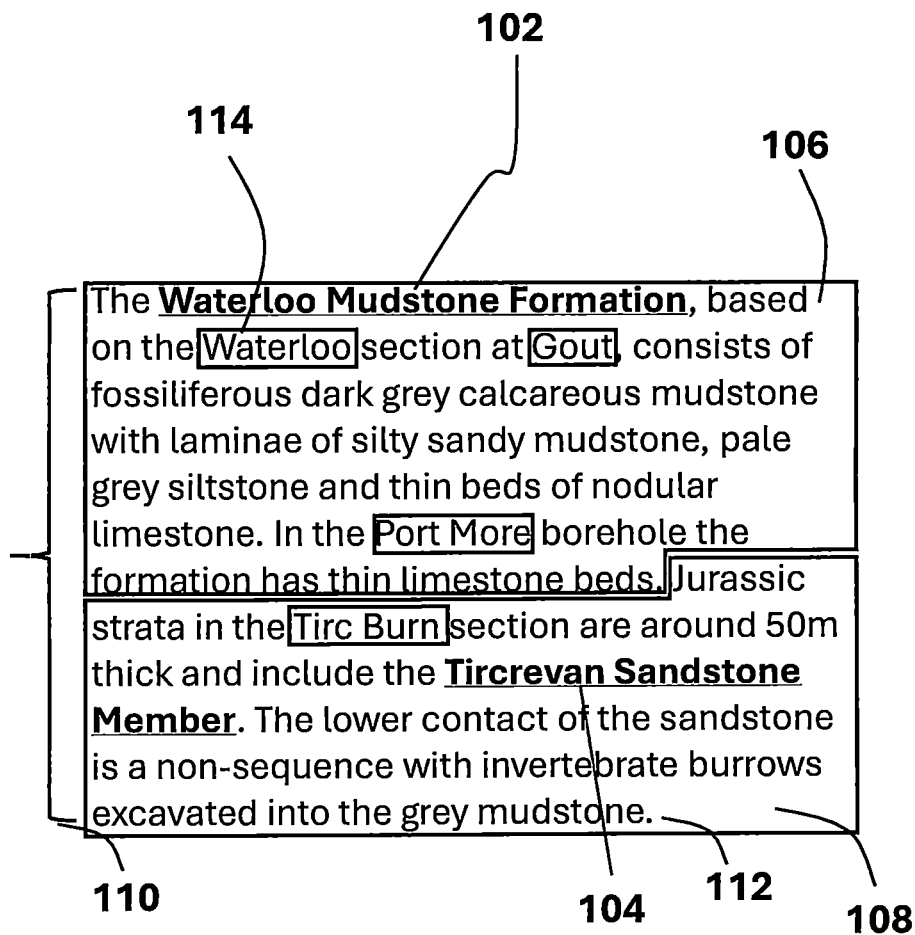

Enter Geological Entities: injectites , basin floor — 1102

| Rank | Name | Country | Similarity | Reliability (Entropy Based) ||||  Feedback |
|---|---|---|---|---|---|---|---|---|
| | | | | Mention | Docs | Author | Reliability SCORE | |
| 1 | Red Fm | Egypt | 82.3% | 34 | 3 | 3 | 306 | |
| 2 | Amber Fm | Bolivia | 76.5% | 12 | 1 | 1 | 12 | X |
| 3 | Ruby Fm | UK | 75% | 10 | 5 | 2 | 100 | |
| 4 | Topaz Fm | USA | 71.04% | 6 | 2 | 2 | 24 | |
| 5 | Pearl Fm | Yemen | 69.87% | 123 | 27 | 13 | 43,173 | |
| More | | | | | | | | |

FIG 11.

METHOD AND SYSTEM FOR GENERATING GEOLOGICAL LITHOSTRATIGRAPHIC ANALOGUES USING THEORY-GUIDED MACHINE LEARNING FROM UNSTRUCTURED TEXT

CROSS-REFERENCE TO RELATED APPLICATIONS

U.S. Patent Documents

U.S. Pat. No. 8,676,721 B2 (September/2009) Piovesan and Kozman
U.S. Pat. No. 7,734,556 B2 (June/2010) Tan
U.S. Pat. No. 8,170,969 B2 (February/2012) Roetteger and Ziegler
U.S. Pat. No. 8,972,339 B2 (March/2015) Aparicio et al
U.S. Pat. No. 9,037,464 B1 (May/2015) Mikolov et al
U.S. Pat. No. 9,292,545 B2 (March/2016) Malik et al

OTHER PUBLICATIONS

Baker, V. R. (2014). Terrestrial analogs, planetary geology, and the nature of geological reasoning. Planetary and Space Science, 95, pp. 5-10
Bloom, Benjamin S. et al. 1956. *Taxonomy of educational objectives, handbook I: The cognitive domain*. New York: David McKay Co Inc.
Bojanowski et al (2016) fastText. [online] https://research.fb.com/fasttext/
Chan, M. A. et al (2016). The Future of Field Geology, Open Data Sharing and CyberTechnology in Earth Science. SEPM, The Sedimentary Record March 2016, pp 4-10.
Cleverley, P. H. and Burnett, S. (2015). Creating Sparks: Comparing Search Results Using Discriminatory Search Term Word Co-Occurrence to Facilitate Serendipity in the Enterprise. *Journal of Information and Knowledge Management*, (JIKM) 14(1), pp. 1-27.
Cleverley, P. H. (2016). Using machine learning to stimulate ideas for geoscientists: Using text analytics in enterprise search to surface the unexpected. Digital Energy and British Computer Society (BCS) Aberdeen Branch, Subsurface Computing and Competitive Advantage Symposium, May 4, 2016, Hilton Doubletree Hotel, Aberdeen, Scotland, UK.
Dai, X. and Prout, B. (2016). Unlock Big Data Emotions: Weighted Word Embeddings for Sentiment Classification. 2016 IEEE International Conference on Big Data, 5-8 Dec. 2016; Washington DC, USA.
Devlin et al (2018) BERT: [online] https://arxiv.org/abs/1810.04805
Gomaa, W. H. and Fahmy, A. A. (2013). A Survey of Text Similarity Approaches. International Journal of Computer Applications, 68(13).
Greenberg, J., (2011). Introduction: Knowledge Organization Innovation: Design and Frameworks. *Bulletin of the American Society for Information Science and Technology*. April/May 2011, 37(4), pp. 12-14.
Hu, Y. (2018). Geo-Text Data and Data-Driven Geospatial Semantics. Geography Compass. Online Article: https://arxiv.org/abs/1809.05636
Karpatne, A. et al (2018). Machine Learning for the Geosciences: Challenges and Opportunities. IEEE Transactions on Knowledge and Data Engineering. Early Access Online Article https://arxiv.org/abs/1711.04708
Kim, S. et al (2018). Mut2Vec: distributed representation of cancerous mutations. BMC Medical Genomics, 11(2). Doi: 10.1186/s12920-018-0349-7
Kumar, A. et al (2013). Hazy: Making it easier to build and maintain Big-Data Analytics. Communications of the ACM, 56(3), pp 40-49
Le, Q. and Mikolov, T. (2014). Distributed representations of sentences and documents. In Proceedings of the 31st International Conference on Machine Learning (ICML-14), pp. 1188-1196.
Ma, X. et al (2015). Illuminate Knowledge Elements in Geoscience Literature. American Geophysical Union, Fall Meting 2015, ID:IN23E-06
Manning, C. D. et al. (2008). *Introduction to Information Retrieval*. Cambridge University Press.
Mikolov, T. et al. (2013). Distributed representations of words and phrases and their compositionality. *Advanced in Neural Information Processing Systems*, pp. 3111-3119.
Mukherjee D, Blomberg J, Akkiraju R, et al. (2013). A case based approach to serve information needs in knowledge intensive processes. IBM research report no. RI 13004, September 2013, https://domino.research.ibm.com/library/cyberdig.nsf/papers/D8E08B9E B4233E8785257BF9002928D6
Nooralahzadeh, F. et al (2006). Evaluation of Domain-specific Word Embeddings using Knowledge Resources. 54th Annual Meeting of the Association for Computational Linguistics. Proceedings of the 1st Workshop on Evaluating Vector-Space Representations for NLP. Aug. 7-12, 2016, Berlin, Germany.
Pennington, J. et al (2014). GloVe: Global Vectors for Word Representation. Proceedings of the 2014 Conference on Empirical Methods in Natural Language Processing (EMNLP), pages 1532-1543, Oct. 25-29, 2014, Doha, Qatar.
Peters et al (2018) ELMO: [online] https://allennlp.org/elmo
Rose, P. R. (2016). Cognitive Bias, The Elephant in the Living Room of Science and Professionalism. American Association of Petroleum Geologists (AAPG) Distinguished Lecture Tour. http://www.aapg.org/career/training/in-person/distinguished-lecturer/abstract/articleid/23068/cognitive-bias-the-elephant-in-the-living-room-of-science-and-professionalism
Sun, S. Q. and Wan, J. C (2002). Geological analogs usage rates high in global survey. Oil & Gas Journal 100(46)
Yu, X. et al (2012). User Guided Entity Similarity Search Using Meta-Path Selection in Heterogeneous Information Networks. CIKM 12, October 29-November 2, Maui, HI, USA.
Zhu, Y. et al (2017). Intelligent Learning for Knowledge Graph towards Geological Data. Hindawi Scientific Programming, Article ID: 5072427

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable

STATEMENT REGARDING PRIOR DISCLOSURES BY THE INVENTOR OR A JOINT INVENTOR

The method of applying space-time aware Lithostratigraphic analogue suggestion from geoscience text using theory-guided machine learning has not been disclosed (outside this United States patent application). A conference presentation in May 2016 at the Digital Energy Conference in Aberdeen, UK (Cleverley 2016) did introduce the notion of using unsupervised machine learning through word co-occurrence to Lithostratigraphic entity names for analogue suggestion. The method of suppressing associated local geographical and successional lithostratigraphy as dimensions for analogue computation along with an entropy reliability score and active (reinforcement) learning mechanism has not been disclosed anywhere outside this United States patent application.

BACKGROUND OF THE INVENTION

(1) Field of the Invention

The present invention relates generally to geoscience, more specifically to the field of entity similarity at the intersection of information retrieval, natural language processing and artificial intelligence.

(2) Description of Related Art

It has been reported that over 60% of petroleum geoscientists believe that the identification of global analogues reduces exploration risk and improves field development decisions (Sun and Wan 2002). Analogues are important to geoscientists in numerous industry sectors such as petroleum, economic mining, geo-health, construction and space exploration (Baker 2014). Nearly all oil and gas companies use geoscience analogues extensively, particularly in data sparse new ventures areas and for peer review processes. Analogues uncover subtle opportunities that may not be apparent from any other technique or technology. The ability to make global comparisons 'casting a wider net than just what is close by' was identified as being particularly useful.

Traditional Information Retrieval (IR) systems are not well suited to answer questions such as '*Have we handled such a case before?*' (Mukherjee et al 2013) or show geoscientists analogues given a specific geological context (Cleverley and Burnett 2015).

Manually created geoscience analogue databases exist and are useful, but as they are manually curated, also potentially blind geoscientists to new discoveries. There is also evidence of significant cognitive bias (Rose 2016), with tendencies for petroleum geoscientists to show overconfidence that uncertainties are known.

In the current data driven environment of 'big data'—exponentially growing information volumes in published literature and reports—it is not possible for scientists to read all that is relevant due to human cognitive processing limitations. Dark data, hidden latent patterns in text may exists in literature (Zheng et al 2015). Whilst most subject matter experts may know the 'big patterns' in their specialties, it is the 'small patterns' within and across the boundaries of these areas that may present the most unexpected, insightful and valuable information.

Text and data mining (TDM) is the use of automated analytical techniques to analyse text and data for patterns, trends and other useful information. These techniques can be used to summarize, synthesize and compare (Manning et al. 2008), supporting higher level thinking processes rather than simply retrieving (remembering) information (Bloom et al. 1956).

Detecting geographical terms in text through geoparsers has been conducted extensively for documents, entities, topics and sentiment (Hu 2018). The geosciences have several unique challenges requiring novel methodologies in machine learning. Geoscience information has high dimensionality, geoscience bodies are not as clear cut as objects in other domains, rare events are of interest and geoscience processes can show long-memory characteristics in time (Karpatne et al 2017). Significant potential exists using data driven approaches that can scan through vast amounts of text to discover interesting patterns representing geoscience relationships.

The method of using unsupervised machine learning based on the co-occurrence patterns of words in high dimensional space (word embeddings) has been used in the biomedical field. This included the classification of cancer, as cancer profiles can be characterized by a series of co-occurring mutations (Kim et al 2018). Dai and Prout (2016) weighted the input terms of such techniques using Part of Speech (POS) tagging, finding that when verbs were weighted higher, accuracy for sentiment analysis was improved.

Entity similarity techniques have been studied extensively (Tan 2010; Roetteger and Ziegler 2012; Yu 2012; Gomaa and Fahmy 2013; Mikolov et al 2013; Pennington et al 2014; Aparicio 2015; Malik et al 2016) but not their use for discovering geoscience analogues in text. Machine learning techniques (Chan 2016; Kumar et al 2013) have been applied to geoscientific texts however, methods focus on using these techniques to disambiguate entities. In addition, Nooralahzadeh et al (2006) applied word embeddings to oil and gas literature with a narrow focus largely on identification of synonyms.

Methods applying text analytics in the geosciences often use deductive extraction using linguistics (dictionaries and taxonomies) and rules (Zhu et al 2017) from text to detect associations to other extractions with results stored in a Knowledge Graph. Whilst this can target specific concepts (e.g. Geological Time, Paleontological Species) a drawback is that any concept which is not modelled a priori, is discarded in any computation. Greenberg (2011) contends that knowledge representations (such as taxonomies) enhance information systems, whilst also blinding us to new knowledge discoveries if used as the only lens when automatically parsing unstructured text.

This argument is taken up specifically in the geosciences (Karpatne et al 2017), suggesting a hybrid model; learning patterns and models from data but without ignoring the wealth of knowledge gathered from geoscientists. This is effectively a critical realist philosophy towards data science.

Anchoring machine learning frameworks with knowledge of what geoscientists deem most useful and interesting for analogues, learned models may have a better chance against overfitting. Methods which are inherently transparent are also deemed to be preferable for geoscientists (Karpatne et al 2017).

Cleverley (2016) was the first to apply numerical representations of words in high-dimensional space, to surface Lithostratigraphic analogues in geoscience text. In this method the system uses the latent structure in text through word co-occurrence patterns to 'learn' similarity in an unsupervised way from named Lithostratigraphic entities. A drawback of using a fixed text 'window' for detecting associations to entities is the large number of false negatives (associated concepts) that are likely to be missed. This may lead to inaccurate similarity computation. In addition, no account was made for hierarchical relations between the entities, where each entity (such as a Formation, Member, Bed) were treated as a flat list. This would also likely lead to inaccurate similarity computation as word co-occurrences to the 'child' Lithostratigraphic entity would not be included when comparing the similarity with the 'parent' Lithostratigraphic entity.

In detail, for this method a static window was applied (10 words) around each Lithostratigraphic entity detected, in order to create an aggregated word co-occurrence based text vector. This encompasses the surrounding words from all mentions of said entity, from which cosine similarity is computed to estimate how similar one entity vector is to another.

From unpublished information science research with geoscientists (Cleverley 2017) the method outlined (Cleverley 2016) appears capable of surfacing unexpected, insightful and valuable suggestions. However, the unpublished research showed that when suggested analogues were scored similar because they were associated with similar local geographical terms or other Lithostratigraphical entities, they were not deemed as interesting or useful. For example, the 'Grey Formation' may often be mentioned near the 'Black Formation' in text, related to local succession (it was deposited before or after), which is not so interesting or useful for analogue purposes as it is unlikely it will tell the geoscientist something they don't already know.

There are precedents for patents awarded to petroleum data processing methods (Piovesan and Kozman 2009).

BRIEF SUMMARY OF THE INVENTION

The present invention is a theory-guided data science method and system for computing geological Lithostratigraphic analogues from the latent patterns in unstructured text.

Five underlying theories inform the invention design specifically for geoscience:

| Theory | Description |
| --- | --- |
| 1 Geological Actualism | Processes in the past are the same as the present. Therefore a meaning of a word is the same regardless of its age context. |
| 2 Geological Succession (Time) | Lithostratigraphic entities occurring locally with the Lithostratigraphic entity (in time), are not useful to be included in the word associations for similarity scores for analogues. |
| 3 Geological Succession (Geography) | Geographical names occurring with the Lithostratigraphic entity (in geography), are not useful to be included in the word associations for similarity scores for analogues. |
| 4 Lithostratigraphy entities in text General-to-Specific | Where Lithostratigraphic entities follow each other in text, using a class hierarchy (Super-group > Group > Formation > Member > Bed); if a more specific class is preceded by (subsumed by) a more general class, the word associations for the specific class are also associated to the more general class. |
| 5 Focus on nouns, adjectives and verbs in geoscience text | Due to the nature of Lithostratigraphic analogues and geological concepts, priority (weighting) is given to nouns first, then adjectives, then verbs in the word associations to detected Lithostratigraphic entities for vector similarity computation. |

Theory #1 is based on the principle of geological actualism; past geological action is like all present geological action. So for text mining similarity purposes, the mention in text of the diagenetic process karstification in context to a geological time period 350 Million years ago is the same as a mention of karstification in context to a geological time period 20 Million years ago. This cannot be said for all human actions, for example farming in context to the 19th century is a quite different process to a mention of farming in context to the $21^{st}$ century.

Theory #2 is a computation that takes into consideration geological succession (Lithostratigraphic units deposited above or below) which are deemed (as stated earlier from unpublished research) not interesting or useful for global analogue suggestion.

For example, consider the text ".the organic rich Blue Formation is of Jurassic age, overlies the Green Formation . . . ". In traditional published unsupervised text machine learning techniques, the 'Green Formation' will have a disproportionately high similarity to the 'Blue Formation' because these actual entity names co-occur in close proximity to one another in the same text window. This is a form of similarity which has been shown to be not so useful when looking for global Lithostratigraphic analogues.

Theory #3 is a computation that takes into consideration local geographical elements (Lithostratigraphic units in the same proximal location) which are generally not seen as interesting or useful for global analogue suggestion.

For example, consider the two sentences in different documents, " . . . west of Spring Mountain is an exposure of the Yellow Formation" and "The Brown Unit can be seen at the base of the Spring Mountain . . . ". In traditional unsupervised text machine learning techniques, the 'Yellow Formation' will have a disproportionately high similarity to the 'Brown Unit' because the same geographical entity (in this case Spring Mountain) co-occurs in proximity to both entity names. Similarity is biased by local geography which has been shown to be not so useful or interesting when suggesting global Lithostratigraphic analogues.

Theory #4 contends that geoscience literature tends to follow from the general to the specific. So a more specific Lithostratigraphic entity (by class) discussed in text occurring after a more general Lithostratigraphic entity (by class) is likely to be a sub-division subsumed (a child entity) to the more general 'parent' entity.

For example, taking a hierarchy rule that in terms of Lithostratigraphic units (classes) Formations contain Members, for the following text, "the Grey Formation the Silver Member" it can be inferred that the Silver Member is 'part of' the Grey Formation and therefore it follows that all of the surrounding text for the Silver Member is also valid by inference for the Grey Formation as part of an amalgamated vector.

Theory #5 is based on geoscience being the study of earth features, history and the processes that act upon the earth. The theory contends that for properties and provenance of a rock, one would expect nouns to be more important (e.g. colour, texture, porosity, age) for analogue suggestion. Therefore, nouns, adjectives and verbs (weighted in decreasing order of importance) are deemed the most important word associations to Lithostratigraphic entities to exploit for geoscience analogues.

The present invention computes a similarity score from resulting vectors of Lithostratigraphic entity names. A reliability (entropy based) score is computed which incorporates the total number of mentions found of the Lithostratigraphic entity (in a given corpus) along with the diversity of documents and authors from which those mentions are distributed. The resulting display of potential global analogues ranked by similarity scores includes a feedback loop allowing the geoscientist to indicate if a suggested analogue is 'good' or 'bad' which can be used to modify weighting of the similarity score, thereby incorporating user feedback in an active learning component.

It would therefore be desirable to have a data processing system and method to suggest global Lithostratigraphic analogues from unstructured text which are not unduly influenced by local time (succession) and space (geography). It would therefore be desirable to have a method and system to compute a similarity score using the processed text vectors of Lithostratigraphic entities which is deemed to give a greater propensity for suggesting useful and interesting global analogues from unstructured text.

This would be useful because there is too much potentially relevant information available for geoscientists to read and it is difficult to search on analogues because they are not always known. Geoscientists may be limited by their own knowledge of keywords for search terms from discovering what is new to science using traditional IR systems.

Accordingly, in one aspect, a computer process as implemented, involves receiving sentences from a plurality of sentences, rules and topic lexicons from a plurality of lexicons in a computer memory. These data in the computer memory are processed with a computer processor to process the text to remove key areas of potential bias and identify entities (Lithostratigraphic entity names). A similarity classification for each entity is computed. A preferred embodiment is a Natural Language Processing (NLP), dictionary (lexicon) and an unsupervised machine learning method. This is achieved by applying a filter to the text removing geographical entities and containing an NLP rule to identify Lithostratigraphic entities; associating the text nearby to said entity until a different entity of the same type is encountered. Subsumed entities are amalgamated. A similarity score is computed by comparing vectors computed from the aggregated text associated with each Lithostratigraphic entity. A reliability score is computed for the entity similarity, based on the entropy of mentions and diversity of documents and authors from which they are derived. The greater the diversity of mentions, documents and authors, the more reliable the similarity measure.

In another aspect, a computer program utilizes computer disk (storage) in which instruction code resides. These instructions when processed by a computer, instruct the computer to compute the similarity of Lithostratigraphic entities, a reliability score and automatic updates to the similarity model based on user feedback. The techniques could be implemented in digital circuitry, hardware, firmware or software. The techniques can be implemented in a computer program written in any form of programming language and on any operating system. Additional embodiments could include one or more computer devices configured to carry out the instructions.

BRIEF DESCRIPTION OF THE SEVERAL VIEWS OF THE DRAWING(S)

The figures attached form part of the specification, further explain the invention and supported by the detailed description, serve to explain the principles of the present invention.

FIG. 1—Example applied to a paragraphs of text.

Figure 2:
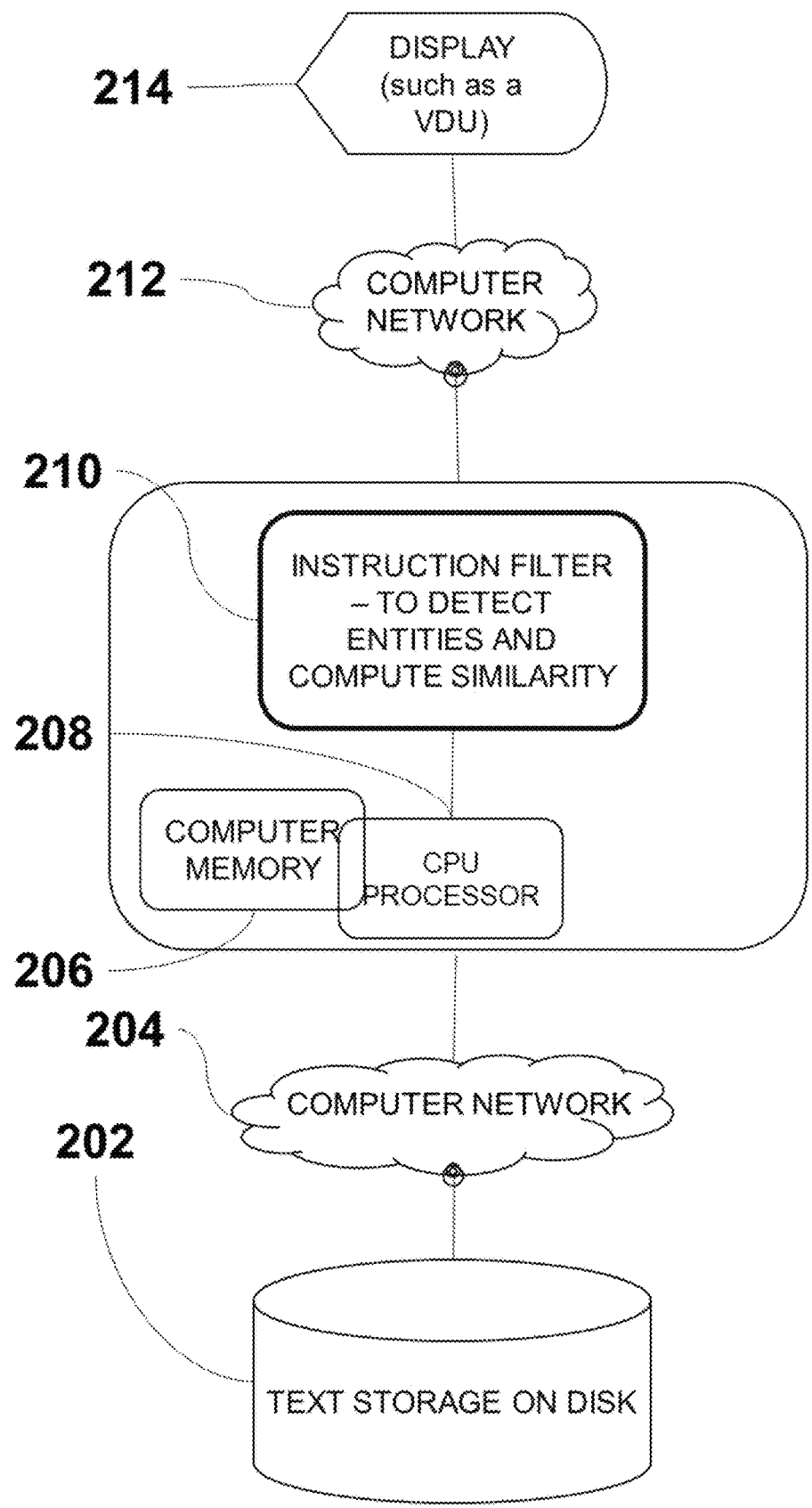

FIG. 2—Diagram illustrating the system architecture.

Figure 3:
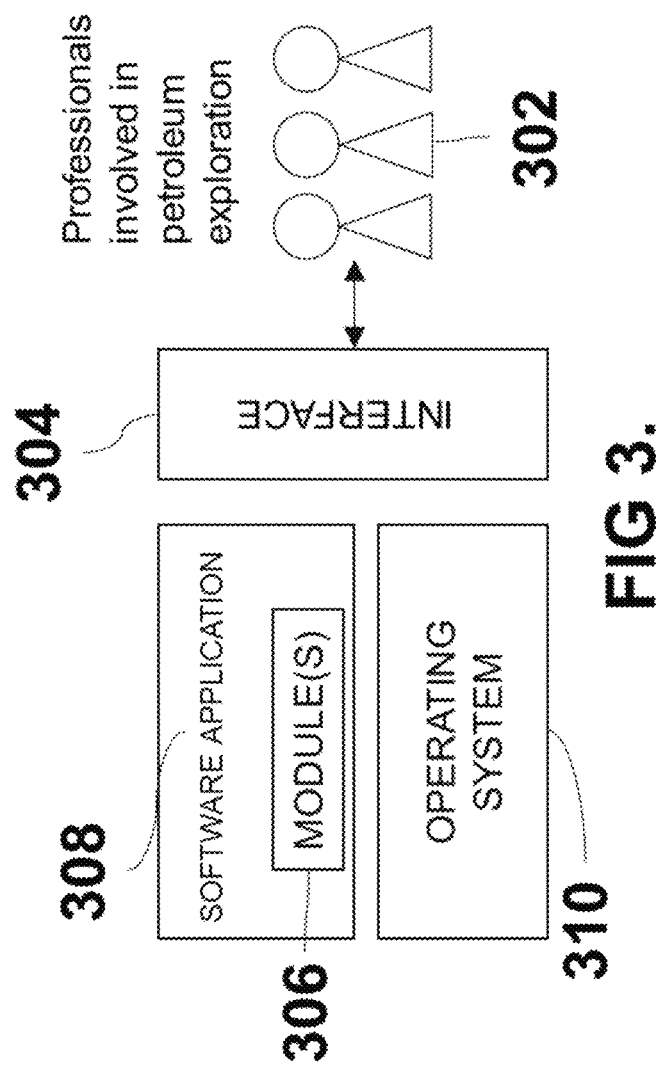

FIG. 3—Schematic illustrating the software system, modules, operating system and user interface.

Figure 4:
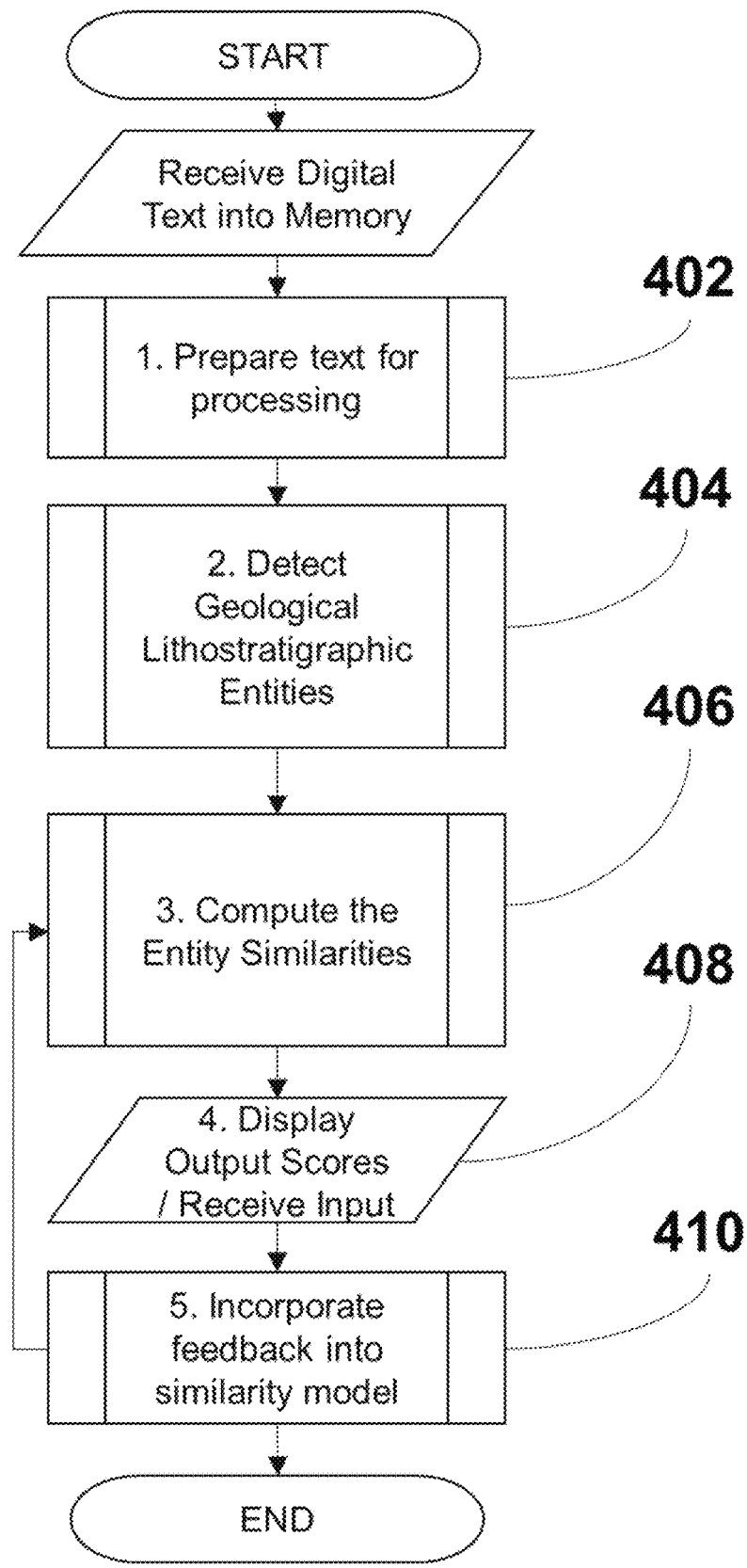

FIG. 4—High level flowchart of operations summarizing the detection of Lithostratigraphic entities in text and computation of similarity, in accordance with a preferred embodiment.

Figure 5:
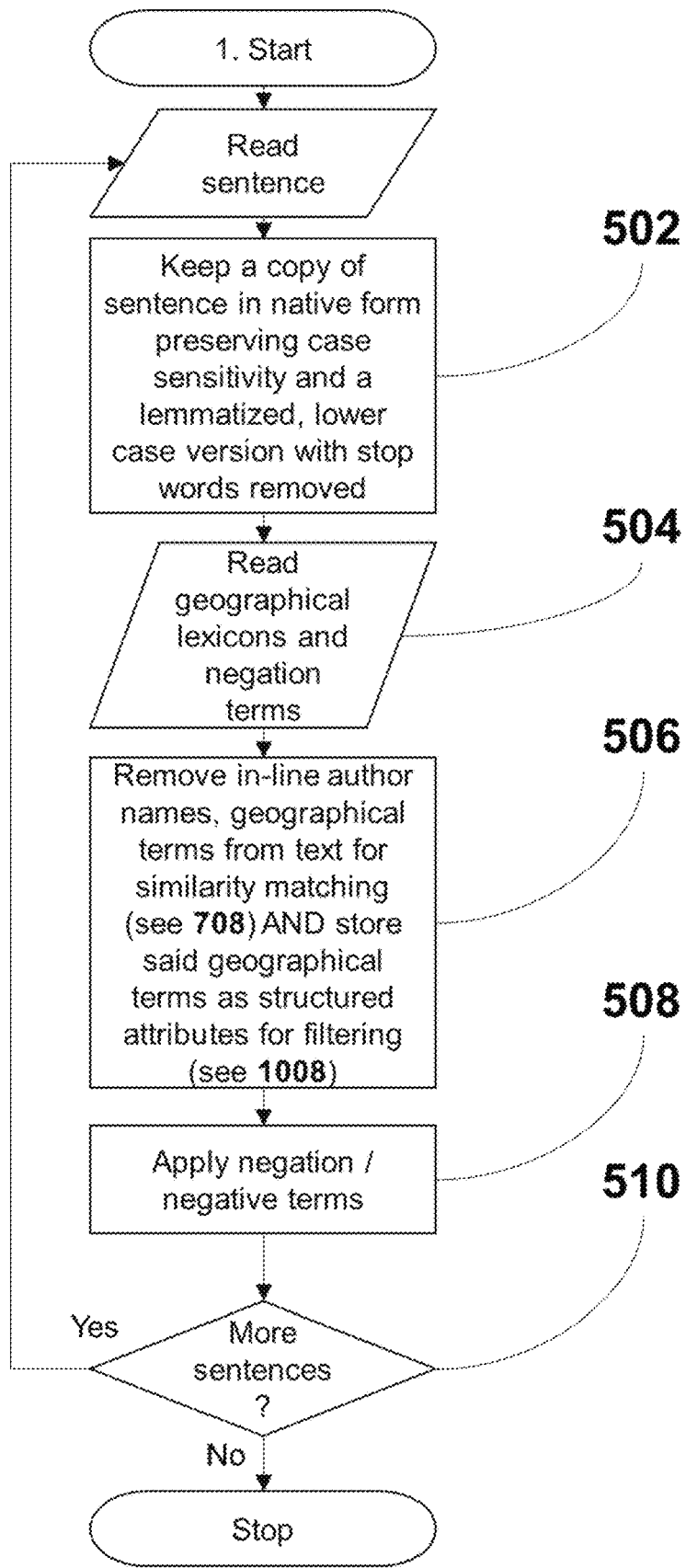

FIG. 5—Flow chart for preparing text (geoparsing and removing geographical entity names).

Figure 6:
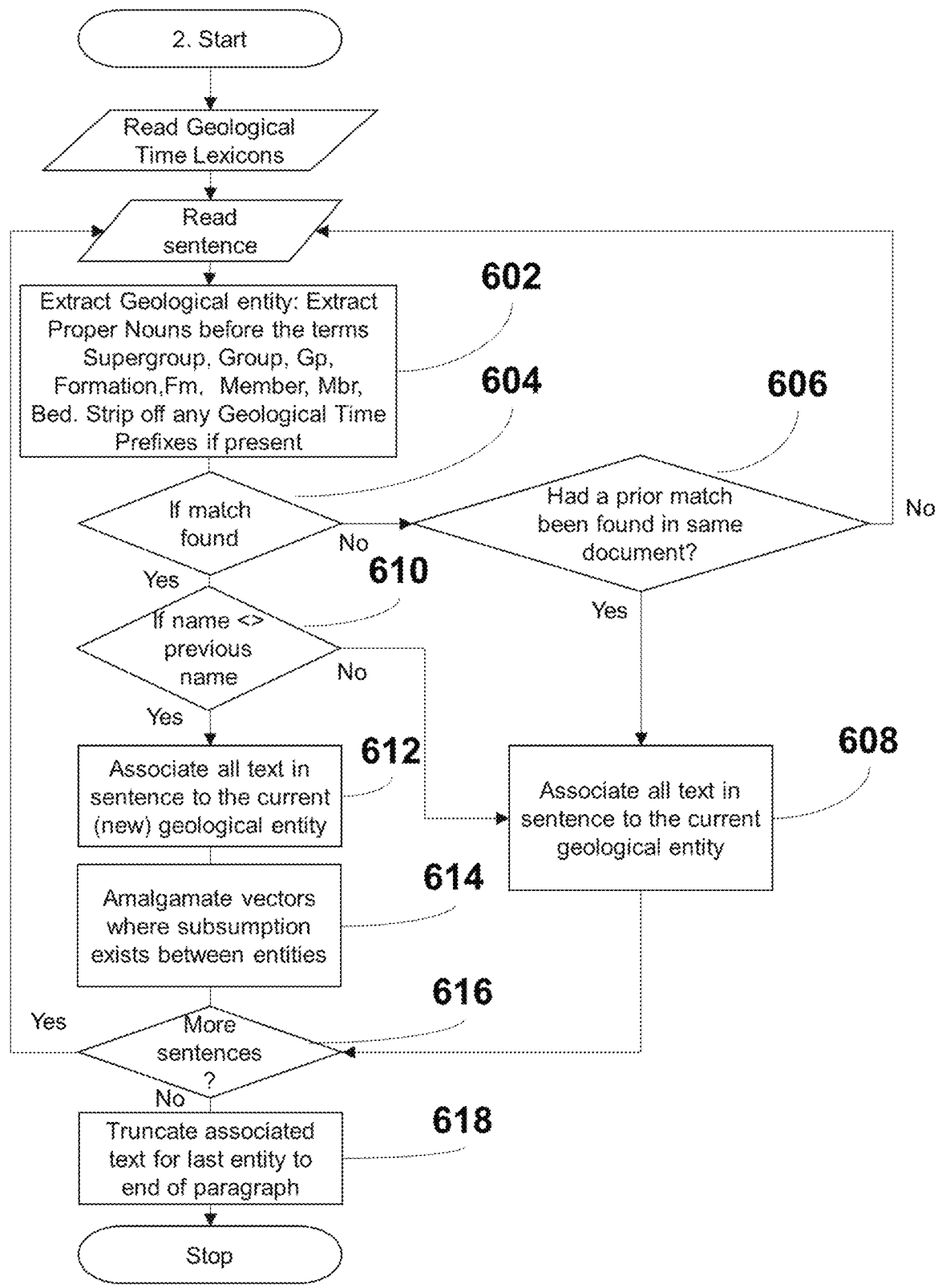

FIG. 6—Flow chart for detecting Lithostratigraphic entities and associating surrounding text.

Figure 7:
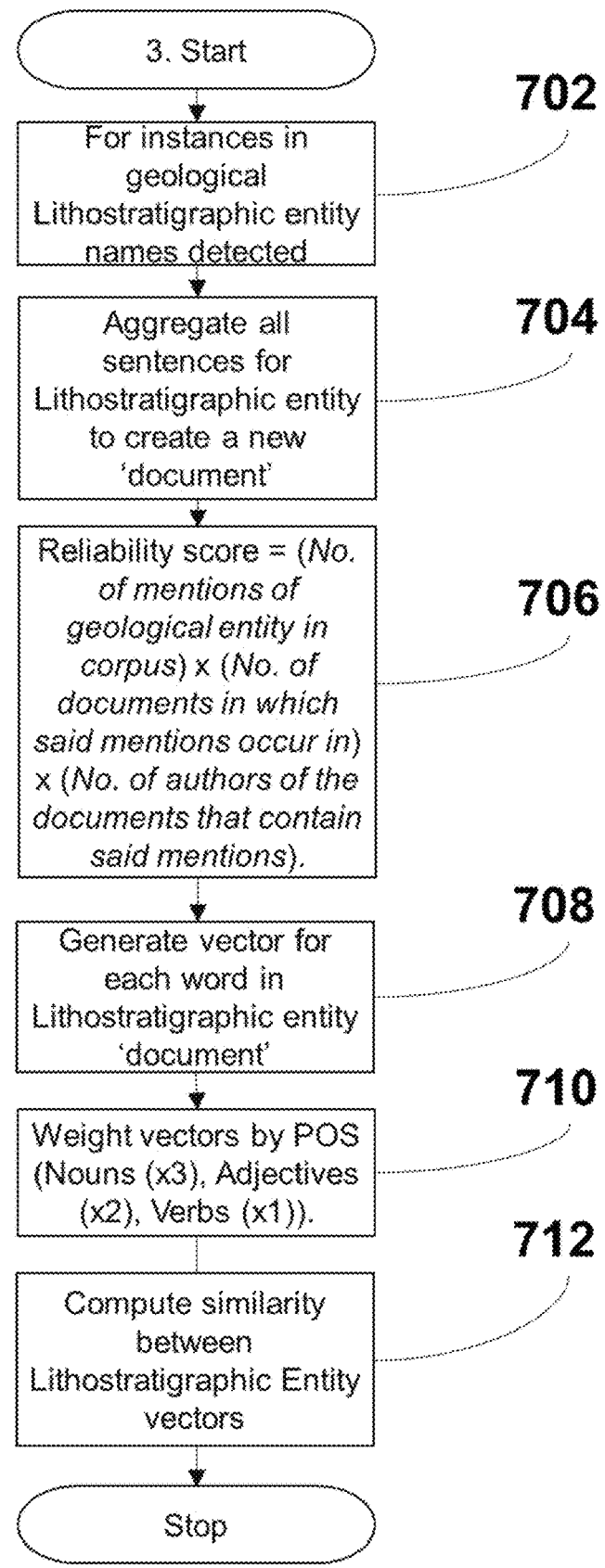

FIG. 7—Flow chart for computing entity similarity and reliability scores.

Figure 8:
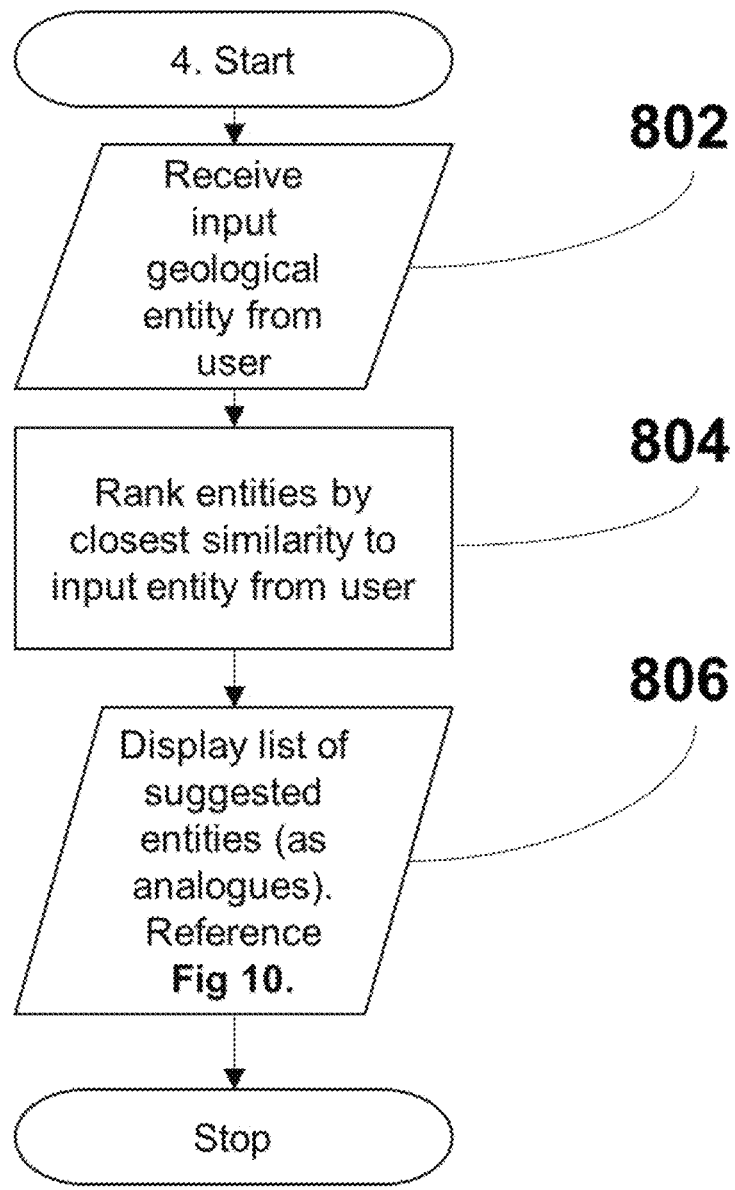

FIG. 8—Flow chart for ranking Lithostratigraphic Units by similarity for a given input.

Figure 9:
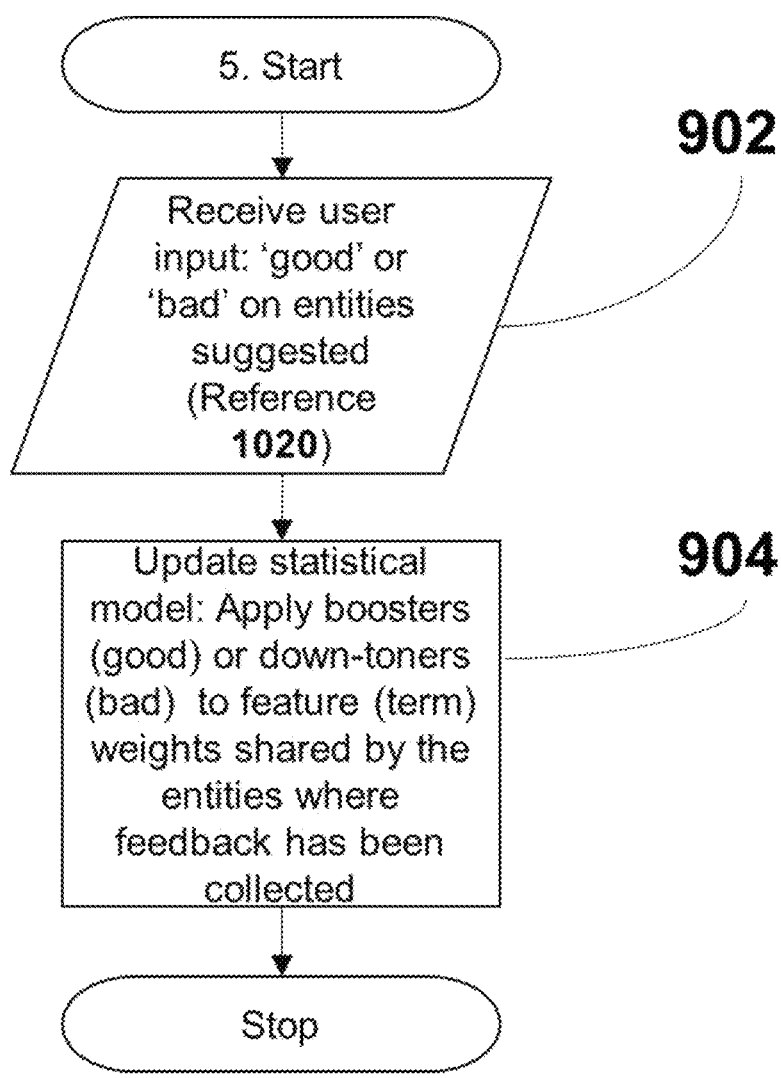

FIG. 9—Flow chart for receiving user feedback and updating similarity model.

Figure 10:
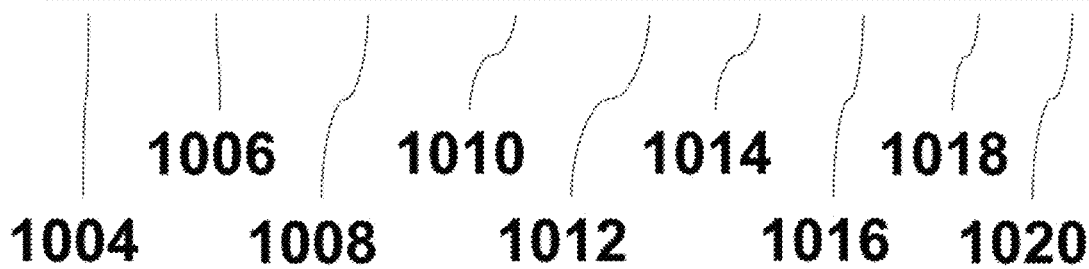

FIG. 10—Schematic showing display for similarity for Lithostratigraphic entities with reliability score and user feedback mechanism.

FIG. 11—Schematic showing display for similarity for Lithostratigraphic entities to a combination of search terms rather than a query for a Lithostratigraphic entity.

DETAILED DESCRIPTION OF THE INVENTION

The various values and configuration discussed in the following sections can be varied and are listed just to illustrate one embodiment. The invention may be embodied in several different forms and should not be taken as limited to the embodiments disclosed. The disclosed embodiments address theory-guided global analogue suggestion for Lithostratigraphic entity names through machine learning from unstructured text. The disclosed embodiments are provided by way of illustration to ensure thorough disclosure and the nature of the inventions to people skilled in the art.

In this document the following definitions are used. Theory-driven data science is the integration of scientific knowledge in learnt machine models. A Lithostratigraphic unit is a geological layer which has a distinct lithology classification and has an areal extent which can be mapped spatially. An information container is any collection of data in computer readable form such as natural language text. This may include a collection of information, an individual document, paragraph, snippet or sentence of information. A named entity is a named noun or noun phrase explicitly mentioned in information containers that uniquely identifies something that exists, such as a geographical place name or geological Lithostratigraphic names.

An example set of sentences and paragraphs within an information container being processed by the method is shown in FIG. 1. A Lithostratigraphic entity name 102 is detected using a ruleset (in this case using Part of Speech (POS) extracting the proper nouns that occur immediately before (and including) the term 'Formation'). A second Lithostratigraphic entity name 104 is detected using the same ruleset (in this case the proper nouns before (and including) the term 'Member'). All of the text prior to detecting the second Lithostratigraphic entity name is associated to the first Lithostratigraphic entity name 106 and subsequent text associated 108 to the second Lithostratigraphic entity name (until another Lithostratigraphic entity name is detected).

An amalgamation processing step 110 is performed where the preceding Lithostratigraphic entity class is 'subsumed' by the previous entity class using the hierarchy rules below:
  Super-group
    Group
      Formation
        Member
          Bed For example, if an entity name such as Crimson Member is found, and the next subsequent entity detected afterwards is Indigo Bed then another vector for the Crimson Member will be created named 'Crimson Member [amalgamated]' that will contain text from both the Crimson Member and Indigo Bed. This continuous automatic roll-up effect allows similarity to be performed on classes of entities (such as a Supergroup) explicitly as well as using implicit knowledge from text associated through its subsumed (child) entities. Should no further Lithostratigraphic entities be detected in the document 112, the co-occurrence window of the last entity detected will be truncated at the end of the paragraph within which the entity was detected.

Any geographical entity names are removed 114 for the similarity computation, using techniques such as dictionaries (lexicons of geographical terms) and/or NLP ruleset matching.

The system architecture (FIG. 2/FIG. 3) is intended as an example, not to impose any architectural limitations on other possible embodiments. FIG. 2 identifies the components comprising of non-volatile hardware storage (disk) 202 that may or may not be attached to a computer network 204, computer memory (RAM) 206, at least one computer processing unit (CPU) 208, and instruction filter 210. The transformed output may be visualized through a number of devices 214 which may or may not be connected through a computer network 212. Certain embodiments of the display include (but are not limited to), a mobile phone, tablet device, virtual reality headset, computer monitor, voice assistant and immersive projection devices. Embodiment may be entirely through hardware, software or a combination of both, all of which could be considered a 'circuit' or 'module'.

In FIG. 3 an example of the overall system, a user 302 interacts through an interface 304 with the transformed derived information products generated by modules 306 in a computer program 308 running on a computer operating system 310. Computer program languages could include (but are not limited to) C++, Java, Python etc.

The method operations (FIG. 4) can be sub-divided into 5 main areas. Firstly, an initial reading of a sentence from a plurality of sentences into memory and instructions to prepare the text for processing 402. Secondly, a module to detect named geological Lithostratigraphic entity names and associate surrounding text accordingly to said entities 404. Thirdly, a module to compute similarity between Lithostratigraphic entity names and a reliability score 406. Four, a module to display the ranked output of the similarity and reliability scores 408. Five, a module to accept user feedback on said ranked Lithostratigraphic entity names and adjust the similarity scores accordingly 410. Each embodiment of these areas is described, but not limited to the following descriptions.

After reading a sentence from a plurality of sentences into memory (FIG. 5), a copy of the original text with case sensitivity is preserved for entity detection 502 and a lowercase version created, lemma's created and diacritics, punctuation, selected stop words removed for text aggregation and subsequent text vector similarity. A geographical dictionary (and/or ruleset) and set of negation/negative terms are read into memory 504.

Geoparsing is performed in order to detect geographical entities in the case sensitive sentence, removing these corresponding names from the lower case text 506 used for similarity matching and added as structured attributes for filtering in the user interface (but play no part in the similarity calculation see 1008). In-line author names are also removed using a pattern rule, such as the following sentence "The Jurassic mudstone of the Magenta Unit was organic rich (Peabody 1985)" would become "The Jurassic mudstone of the Magenta Unit was organic rich". The author name is stored as a structured attribute of this mention (in addition to the author of the overall original document (information container)). These author counts are used in the reliability score (see 706).

The negation/negative terms 508 are used to ensure context is used in the similarity computation, such that given the text, "The Purple Formation is porous" and the text "The Orange Formation is not porous" the negation/negative lexicon is used in order to differentiate the token 'porous' and 'not porous' as being opposite in similarity. This mitigates loss of accuracy through a Bag of Words (BoW) model where each word is treated independently from its context in machine learning. The use of skip-grams allows more complex sentence structure (where negation is juxtaposed not adjacent to terms) to be parsed for negation such as " . . . porous rocks were not found in the Cyan Member . . . ". In this case a skip-gram of [porous_not] can be created using a bigram with two skips. The process is repeated for the next sentence 510.

FIG. 6 shows the operations to associate text to the related Lithostratigraphic entity name. Rulesets are applied to a sentence in order detect Lithostratigraphic entity names 602. This includes stripping off Geological Time prefixes from said entities (but not removed in the lowercase associated text), thus 'Lower Jurassic Kimmeridge Clay Formation' becomes 'Kimmeridge Clay Formation'. In unpublished research (Cleverley 2017) this has been shown to be an issue for false negatives if not addressed.

If a match is not found 604 an additional check is made as to whether it has been found immediately prior to detection in the same information container 606. If not, the sentence is skipped, if a match 608 was previously found then all the associated text is associated to the last match in the information container. If a match was found at process 604, an additional check is made to identify if the name is different 610 to the previous match in the same information container. If it is not 608, then all the text is associated to the last match in the information container; if it is different then the text is associated to the newly detected Lithostratigraphic entity name 612.

A final amalgamation inference process is executed if the current entity class is subsumed by the previous entity class as described in 110. This in effect means for every instance of Lithostratigraphic entity (except for the lowest leaf of 'Bed') there are two potential vectors; one which only refers to the explicit word associations to the mention of that Lithostratigraphic entity name and one that also includes implicit word associations brought in from its inferred subsumed (child) Lithostratigraphic entity classes. If there are more sentences 616 the process is repeated. If no further entities are detected in the document and the last sentence has been processed, the co-occurrence window for the last detected entity is truncated 618 at the end of the paragraph in which it was detected. The process is repeated and a new document processed one sentence at a time, until all documents in the corpus have been processed.

FIG. 7 shows the workflow for reliability and similarity score computation. When all sentences in the corpus have been processed, the co-occurrence window text for each unique Lithostratigraphic entity name is aggregated 702 forming a new information container (document) for that Lithostratigraphic entity 704. A reliability score computed 706, an entropy based measure including sample size (number of detections of said Lithostratigraphic entity name), information container diversity (number of documents generating those mentions) and provenance diversity (number of unique authors/sources who have generated the documents). These are multiplied together to form an overall entropy score, the higher the number, the greater the reliability of the similarity score.

Using distributional semantics (counting) or text embedding (prediction) methods (or other such technique), a vector is computed for each Lithostratigraphic entity information container (document) 708. Word vectors are weighted giving priority to nouns, followed by adjectives followed by verbs 710 to create an overall aggregated vector for each Lithostratigraphic entity.

A similarity score is computed for each Lithostratigraphic entity to every other Lithostratigraphic entity 712 using such method as cosine similarity (measures the angle between vectors in n-dimensional space). This may be pre-computed and stored in an array structure or performed in real time against the statistical model.

A preferred embodiment for vector creation goes beyond computing one vector per word (Mikolov et al 2013; Pennington et al 2014, Le and Mikolov 2014). Using characters/word pieces to handle unseen words (Bojanowski et al 2016), more than one vector per word to cater for polysemy (Peters et al 2018) and use of transfer learning and flexible context windows (not fixed) to capture longer term dependency (Devlin et al 2018).

FIG. 8 shows the method of ranking for similarity given an initial user input. A user interface allowing a user to input query terms 802 can display 804 these similarities and reliability scores ranked in order of closest similarity (the more similar the vectors representing each Lithostratigraphic entity name, the closer the cosine will be to 1) to the input context 806. The Lithostratigraphic entity name closest to 1 would be ranked first, the Lithostratigraphic entity name furthest from 1 would be displayed last.

FIG. 9 shows the method for incorporating feedback given user input, after ranked Lithostratigraphic entity names have been displayed. Through the user interface this can receive user feedback based on the rankings 902 as to whether the analogue suggestions are deemed useful or not by the geoscientist. This positive and negative user feedback can be incorporated in the statistical ranking model in a number of ways 904. This includes (but is not limited to) modification of input text/co-occurrence prior to similarity computation (such as addition/removal of certain terms) or adjustment (increase/decrease) of the overall computed paired similarity score.

FIG. 10 shows one embodiment of a user interface. Given user input 1002, Lithostratigraphic Entity Names 1006 are ranked 1004 by their cosine similarity 1010 allowing filtering by geographical entities 1008. An entropy (reliability score) allows the user to view the number of mentions of the detected Lithostratigraphic Entity Name 1012, the number of unique documents from which those mentions are derived 1014 and number of unique authors from which all of those are derived 1016. An overall reliability score could be colour coded to indicate where the similarity score may be potentially suspect 1018. Post query user feedback could be collected 1020 as positive or negative to the suggested Lithostratigraphic entity names. This could be used to adjust similarity calculations. FIG. 11 illustrates how the input context could be a combination of terms from the text corpus as well as an 'exemplar' Lithostratigraphic entity name used as an input query. In this example the vectors of the terms entered would be summed (which could include a weighting (such as TF-IDF) biasing towards the more specific term(s) which has a stronger signal) in order to generate a similarity score to Lithostratigraphic entity names.

The invention claimed is:

1. A computer implemented process for suggesting space-time aware geological Lithostratigraphic analogues from text using theory-guided machine learning, the process comprising:
receiving into a computer memory: sentences of text, geographical lexicons, negation/negative terms, geological time lexicons and Natural Language Processing (NLP) rules, processing a data in the computer memory with a processor to detect geological Lithostratigraphic entity names,
processing the data in the computer memory with a processor to compute similarity between Lithostratigraphic entities through word associations,
applying a filter around the detected geological Lithostratigraphic entities, the filter having a dynamic width defined by a window length comprising a first mention of a Lithostratigraphic entity and a subsequent mention of a different Lithostratigraphic entity, removing all geographical terms from these text and combining the texts as it relates to each Lithostratigraphic entity, the filter output providing an input to a learned statistical model where the positive and negative user feedback can be incorporated in the statistical ranking model, weighting from high to low nouns, adjectives, and verbs, from which a Lithostratigraphic entity-entity similarity is determined; and
outputting the Lithostratigraphic entity-entity similarity through cosine similarity.

2. The computer-implemented process of claim 1 further comprising:
computing an entropy reliability function for each entity using the number of mentions of a Lithostratigraphic entity multiplied by a number of documents and further multiplied by a number of unique authors/sources for documents.

3. The computer-implemented process of claim 2 further comprising: receiving into the computer memory, human feedback from judgments of geologists on the suitability of Lithostratigraphic entity display ranking based on similarity score ranking;

processing the data in computer memory using a computer processor to incorporate a user feedback into the Lithostratigraphic entity similarity calculation, by:

altering the learned statistical model for the Lithostratigraphic entities, through reduction or increase of at least one of an original input text and overall pairwise similarity score.

\* \* \* \* \*